US012169594B2

(12) United States Patent
Wong et al.

(10) Patent No.: US 12,169,594 B2
(45) Date of Patent: Dec. 17, 2024

(54) HANDWRITTEN DATA GENERATION APPARATUS, HANDWRITTEN DATA REPRODUCTION APPARATUS, AND DIGITAL INK DATA STRUCTURE

(71) Applicant: Wacom Co., Ltd., Saitama (JP)

(72) Inventors: Henry Wong, Mill Creek, WA (US); Ipei Hung, Saitama (JP)

(73) Assignee: Wacom Co., Ltd., Saitama (JP)

(*) Notice: Subject to any disclaimer, the term of this patent is extended or adjusted under 35 U.S.C. 154(b) by 377 days.

(21) Appl. No.: 17/215,976

(22) Filed: Mar. 29, 2021

(65) Prior Publication Data

US 2021/0311551 A1 Oct. 7, 2021

Related U.S. Application Data

(60) Provisional application No. 63/003,577, filed on Apr. 1, 2020.

(30) Foreign Application Priority Data

Dec. 9, 2020 (JP) .................................. 2020-204526

(51) Int. Cl.
G06F 3/01 (2006.01)
G06F 3/03 (2006.01)
G06F 3/0354 (2013.01)
G06F 3/041 (2006.01)

(52) U.S. Cl.
CPC ............ G06F 3/016 (2013.01); G06F 3/0317 (2013.01); G06F 3/03545 (2013.01); G06F 3/04162 (2019.05); G06F 2203/04105 (2013.01)

(58) Field of Classification Search
CPC .... G06F 3/016; G06F 3/0317; G06F 3/03545; G06F 3/04162; G06F 2203/04105; G06F 3/04883; G06F 3/0442; G06V 30/19007; G06V 30/36
See application file for complete search history.

(56) References Cited

U.S. PATENT DOCUMENTS

| 10,503,255 | B2 | 12/2019 | Ramstein et al. |
| 10,642,356 | B1* | 5/2020 | Wang ...................... G06F 3/014 |
| 2010/0130257 | A1* | 5/2010 | Jang ........................ H04N 7/147 |
| | | | 345/173 |
| 2015/0253851 | A1* | 9/2015 | Oh ....................... G06F 3/04883 |
| | | | 345/179 |
| 2016/0259435 | A1* | 9/2016 | Qian ........................ G06F 3/011 |
| 2016/0282970 | A1* | 9/2016 | Evreinov ............... G06F 3/0383 |
| 2016/0364607 | A1* | 12/2016 | VanBlon ................. G06V 30/36 |
| 2017/0364167 | A1* | 12/2017 | Ribeiro ................. G06F 3/0442 |

FOREIGN PATENT DOCUMENTS

JP 2012-118993 A 6/2012

* cited by examiner

*Primary Examiner* — Angie Badawi
(74) *Attorney, Agent, or Firm* — Seed IP Law Group LLP

(57) ABSTRACT

A handwriting data generation apparatus includes a memory containing processor-executable instructions and a processor coupled to the memory. The processor is configured to perform, when loaded with the processor-executable instructions, associating tactile feedback with at least part of stroke data generated according to handwriting input, and generating digital ink including haptics data indicating the stroke data and the tactile feedback.

26 Claims, 15 Drawing Sheets

FIG.4

```
<trace brushRef="#penA", timeOffset=0>     ⎫
  X,Y,Tilt,F1,F2,··· ~ PD                  ⎪
  X,Y,Tilt,F1,F2,···                       ⎬ ST
  ...                                      ⎪
</trace>                                   ⎭
<trace brushRef="#penB", timeOffset=1000>  ⎫
  X,Y,Tilt,F1,F2,···                       ⎪
  X,Y,Tilt,F1,F2,···                       ⎬ ST
  ...                                      ⎪
</trace>                                   ⎭
...
```
102

FIG.5

```
Haptics Effect data Field:
    HE1: No haptics        123
122 ─── HE2:                ⎞
        Haptics Effect: wave-file 20;
    HE3:
        Haptics Effect: wave-file 30;
```
121

FIG.12

```
<trace brushRef="#penA", timeOffset=0>       ⎫
 X,Y,Tilt,F1,F2,HEP,···  ~ PDa               │
 X,Y,Tilt,F1,F2,HEP,···                      ⎬ ST
 ···                                         │
</trace>                                     ⎭
<trace brushRef="#penB", timeOffset=1000>    ⎫
 X,Y,Tilt,F1,F2,HEP,···                      │
 X,Y,Tilt,F1,F2,HEP,···                      ⎬ ST
 ···                                         │
</trace>                                     ⎭
···
```

| PEN PRESSURE VALUE | HAPTICS STRENGTH |
|---|---|
| 0 | 0% |
| 1~16 | 10% |
| 17~32 | 20% |
| ⋮ | ⋮ | ns of the present invention will now be described in detail with reference to the attached drawings.
HANDWRITTEN DATA GENERATION APPARATUS, HANDWRITTEN DATA REPRODUCTION APPARATUS, AND DIGITAL INK DATA STRUCTURE

BACKGROUND

Technical Field

The present invention relates to a handwriting data generation apparatus, a handwriting data reproduction apparatus, and a data structure of digital ink, and particularly, to a handwriting data generation apparatus, a handwriting data reproduction apparatus, and a data structure of digital ink using tactile feedback.

Description of the Related Art

A tablet terminal is known which, in response to an operation of selecting text displayed on a touch screen, inserting a cursor into the text or positioning the cursor, provides tactile feedback. An example of such tablet terminal is disclosed in Japanese Patent Laid-Open No. 2012-118993.

BRIEF SUMMARY

According to one aspect the invention provides a handwriting data generation apparatus that generates tactile feedback corresponding to stroke data, a handwriting data reproduction apparatus that generates tactile feedback corresponding to stroke data, and a related data structure of digital ink.

The present invention provides a handwriting data generation apparatus including a processor, wherein the processor associates tactile feedback with at least part of stroke data generated according to handwriting input and generates digital ink including haptics data indicating the stroke data and the tactile feedback.

The present invention provides a handwriting data reproduction apparatus including a display and a processor, wherein the processor acquires digital ink including haptics data indicating stroke data and tactile feedback, reproduces the stroke data to display the stroke data on the display, and controls a force sense generation device to reproduce the tactile feedback indicated by the haptics data at the time of reproduction of the stroke data.

The present invention provides a data structure of digital ink. The data structure is used in a computer including a display, a storage unit, and a processor. The data structure is stored in the storage unit. The data structure includes stroke data and haptics data that associates tactile feedback with target stroke data in the stroke data. The data structure is used to reproduce the stroke data for displaying the stroke data on the display and is used by the processor to acquire content of the tactile feedback from the storage unit, to control a force sense generation device to reproduce the tactile feedback indicated by the haptics data at the time of reproduction of the stroke data.

According to the present invention, the tactile feedback corresponding to the stroke data can be generated.

BRIEF DESCRIPTION OF THE DRAWINGS

FIG. 4 depicts an example of a stroke data group illustrated in FIG. 3;

FIG. 5 depicts an example of haptics effect definition data illustrated in FIG. 3;

FIG. 12 depicts an example of the stroke data group according to a third embodiment of the present invention;

FIG. 14 depicts a correspondence table that associates pen pressure values with haptics data;

DETAILED DESCRIPTION

Embodiments of the present invention will now be described in detail with reference to the attached drawings.

Figure 1:
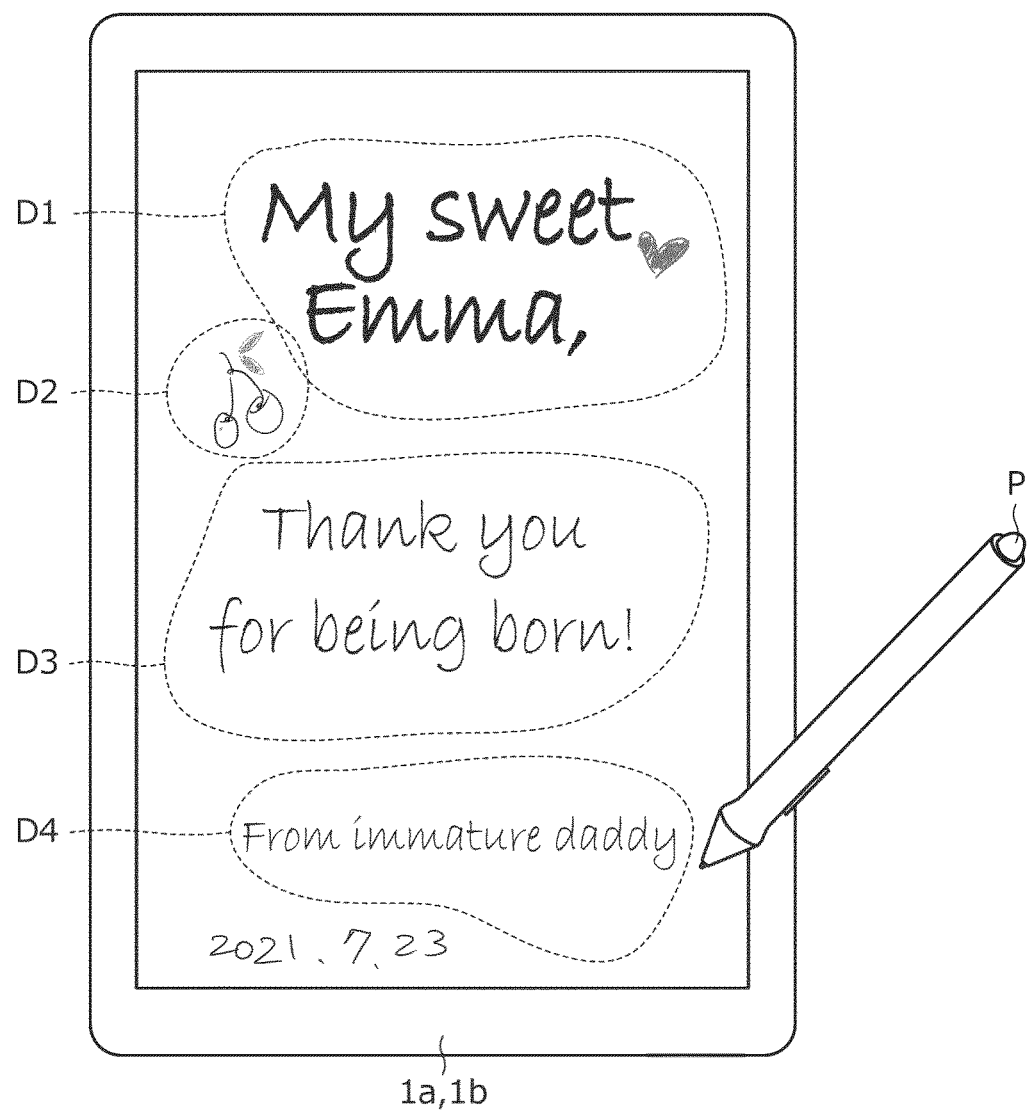
FIG. 1 depicts an appearance of tablet terminals according to a first embodiment of the present invention.
Figure 2:
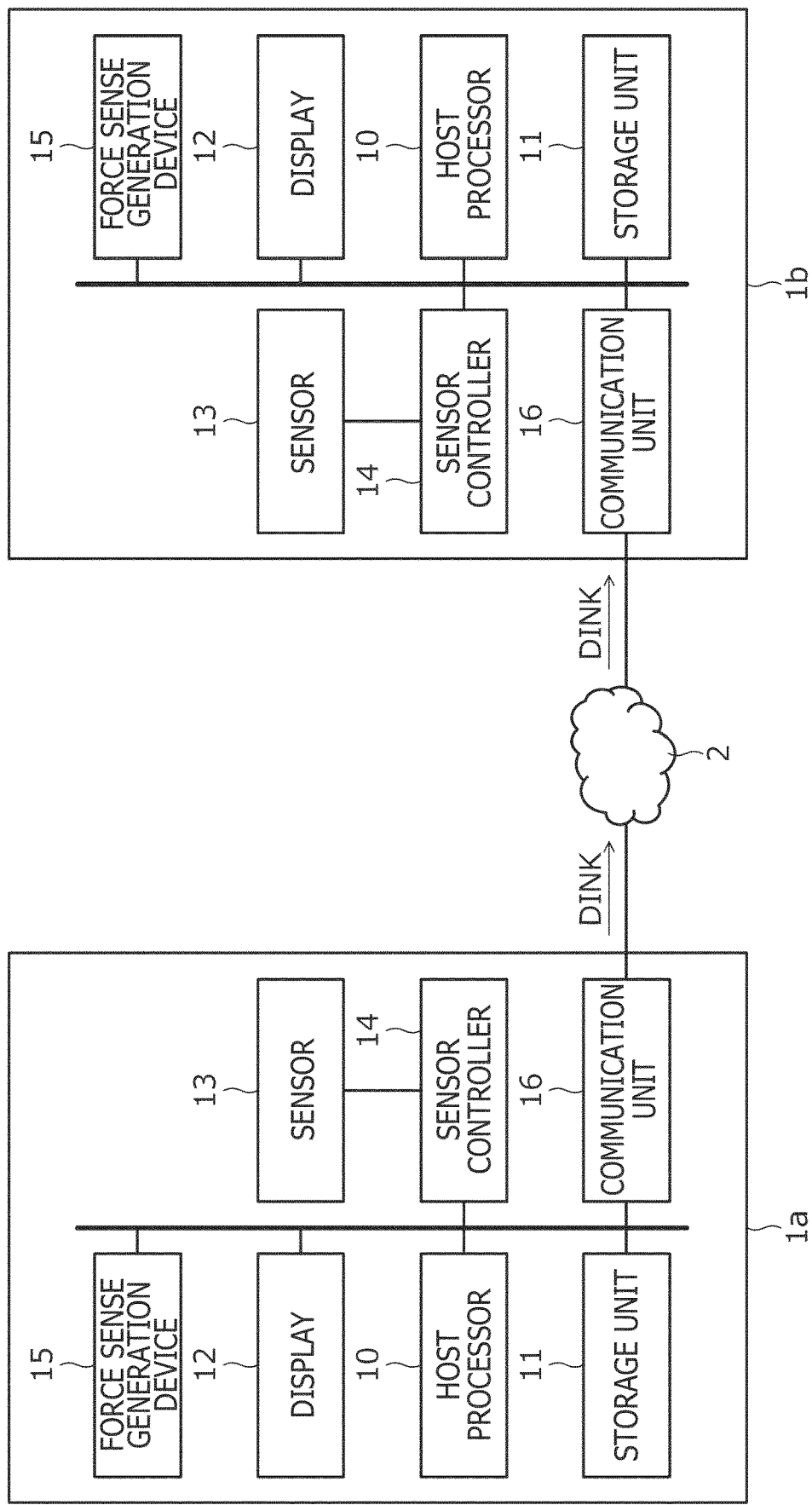
FIG. 2 depicts an internal configuration of the tablet terminals illustrated in FIG. 1.

FIG. 1 depicts an appearance of tablet terminals 1a and 1b according to a first embodiment of the present invention. FIG. 2 depicts an internal configuration of the tablet terminals 1a and 1b.

As can be understood from FIG. 2, the tablet terminals 1a and 1b are computers of the same configuration, and the tablet terminals 1a and 1b are connected with each other through a communication network 2. In the present embodiment, the tablet terminal 1a is a "handwriting data generation apparatus" that generates digital ink DINK and is configured to supply the generated digital ink DINK to the tablet terminal 1b through the communication network 2. The tablet terminal 1b is a "handwriting data reproduction apparatus" that reproduces the digital ink DINK and is configured to reproduce the digital ink DINK supplied from the tablet terminal 1a. Note that it is obvious that each of the tablet terminals 1a and 1b may have functions of both the "handwriting data generation apparatus" and the "handwriting data reproduction apparatus." A computer, such as a personal computer and a smartphone, other than the tablet terminals can also be provided with the functions of the "handwriting data generation apparatus" and the "handwriting data reproduction apparatus."

As illustrated in FIG. 2, each of the tablet terminals 1a and 1b includes a host processor 10, a storage unit 11, a display 12, a sensor 13, a sensor controller 14, a force sense generation device 15, and a communication unit 16.

Although the tablet terminal 1a will mainly be described in detail below, the description similarly applies to the tablet terminal 1b. Note that the tablet terminal 1a may include, instead of the display 12, a touch surface to be touched by an indicator, such as an electronic pen P and a finger.

The host processor 10 is a central processing unit that controls the entire tablet terminal 1a including the display 12 and the force sense generation device 15. The host processor 10 executes programs stored in the storage unit 11 to play a role of executing an operating system of the tablet terminal 1a, drawing software, and various applications. The storage unit 11 is a storage device that can store any data, and the storage unit 11 includes a main storage device, such as a Dynamic Random Access Memory (DRAM), and an auxiliary storage device, such as a hard disk.

The display 12 is a display device that displays any data according to control of the host processor 10, and the display 12 is, for example, a liquid crystal display or an organic electroluminescence (EL) display. The sensor 13 includes a sensor pattern including a plurality of sensor electrodes connected to the sensor controller 14. The sensor 13 is arranged inside a display surface of the display 12. Thus, the display surface of the display 12 serves as the touch surface in the tablet terminal 1a. However, the touch surface may be provided at a position different from the display surface of the display 12, and in that case, the sensor 13 is arranged inside the touch surface.

The sensor controller 14 is an integrated circuit with a function of detecting the position of the indicator, such as the electronic pen P illustrated in FIG. 1 and a finger, on the touch surface through the sensor 13 and a function of communicating with the electronic pen P. The sensor controller 14 uses, for example, a capacitance system to detect the position of the finger and uses, for example, an active capacitive system to detect the position of the electronic pen P and communicate with the electronic pen P. Note that the sensor controller 14 may use an electromagnetic induction system to detect the position of the electronic pen P and communicate with the electronic pen P. When the sensor controller 14 detects the position of the finger or the electronic pen P or when the sensor controller 14 communicates with the electronic pen P to receive data from the electronic pen P, the sensor controller 14 sequentially supplies the position or the data to the host processor 10. The host processor 10 executes such processes as generating and drawing the digital ink DINK and moving a cursor, based on the position and the data supplied in this way.

The active capacitive system will briefly be described. Hereinafter, a signal transmitted from the sensor controller 14 to the electronic pen P will be referred to as an "uplink signal," and a signal transmitted from the electronic pen P to the sensor controller 14 will be referred to as a "downlink signal."

The sensor controller 14 uses the sensor 13 to periodically transmit the uplink signals at constant time intervals. The uplink signals transmitted in this way include commands that are instructions for the electronic pen P.

The electronic pen P includes a pen tip electrode provided at a pen tip; a control unit that receives the uplink signal and transmits the downlink signal through the pen tip electrode; a pen pressure detection unit that detects a value of pressure (pen pressure value) applied to the pen tip; a grip force detection unit that detects a value of pressure (grip force value) applied to a side surface of the housing of the electronic pen P; a power source that supplies power necessary for the operation of the electronic pen P; and a storage unit that stores various types of data such as a pen identification (ID) for uniquely identifying the electronic pen P.

The control unit of the electronic pen P is configured to transmit a downlink signal in response to reception of an uplink signal. The downlink signal transmitted in this way is a signal including only a burst signal that is an unmodulated carrier signal when the sensor controller 14 and the electronic pen P have not yet detected each other. On the other hand, the downlink signal is a signal including a shorter burst signal and a data signal modulated with data according to the command included in the uplink signal when the sensor controller 14 and the electronic pen P have detected each other. The data transmitted by the data signal can include the pen pressure value, the grip force value, and the pen ID.

At the stage where the sensor controller 14 has not yet detected the electronic pen P, the sensor controller 14 uses all of the sensor electrodes included in the sensor 13 to receive the burst signals and thereby attempt to detect the position of the electronic pen P on the entire touch surface (global scan). After the detection of the position of the electronic pen P as a result of the attempt, the sensor controller 14 uses only one or more sensor electrodes near the detected position to receive the burst signals and update the position of the electronic pen P (local scan) and receives and demodulates the data signal to receive the data transmitted from the electronic pen P.

The electronic pen P may include a plurality of pen tip electrodes arranged adjacent to each other in the penholder direction, and each of the pen tip electrodes may be configured to transmit the burst signal. In this case, the sensor controller 14 distinguishes and receives the burst signal transmitted from each of the pen tip electrodes to derive the positions of the pen tip electrodes and acquires a tilt angle indicating the tilt of the electronic pen P based on the result. The tilt angle is also supplied to the host processor 10 similarly to other data, and the tilt angle is used for such processes as generating and drawing the digital ink DINK. Note that a gyro sensor may be provided in the electronic pen P, and the tilt angle of the electronic pen P may be calculated from an output value of the gyro sensor. In this case, the output value of the gyro sensor may be supplied from the electronic pen P to the sensor controller 14, and the tilt angle may be calculated in the sensor controller 14. Alternatively, the tilt angle may be calculated in the electronic pen P, and the calculation result of the tilt angle may be supplied from the electronic pen P to the sensor controller 14.

The components illustrated in FIG. 2 will be further described. The force sense generation device 15 is a device that provides tactile feedback to the user. The force sense generation device 15 can include, for example, a vibrator that vibrates according to the waveform of an input current, or magnetic fluid of which the hardness can be controlled by the waveform of the input current. In a typical example, the force sense generation device 15 is arranged inside the housing of the tablet terminal 1a and is configured to provide vibration to the housing surface including the touch surface.

The communication unit 16 is a communication apparatus that connects the host processor 10 to the communication network 2. The communication unit 16 in the present embodiment is used to transmit and receive the digital ink DINK between the tablet terminal 1a and the tablet terminal 1b.

Figure 3:
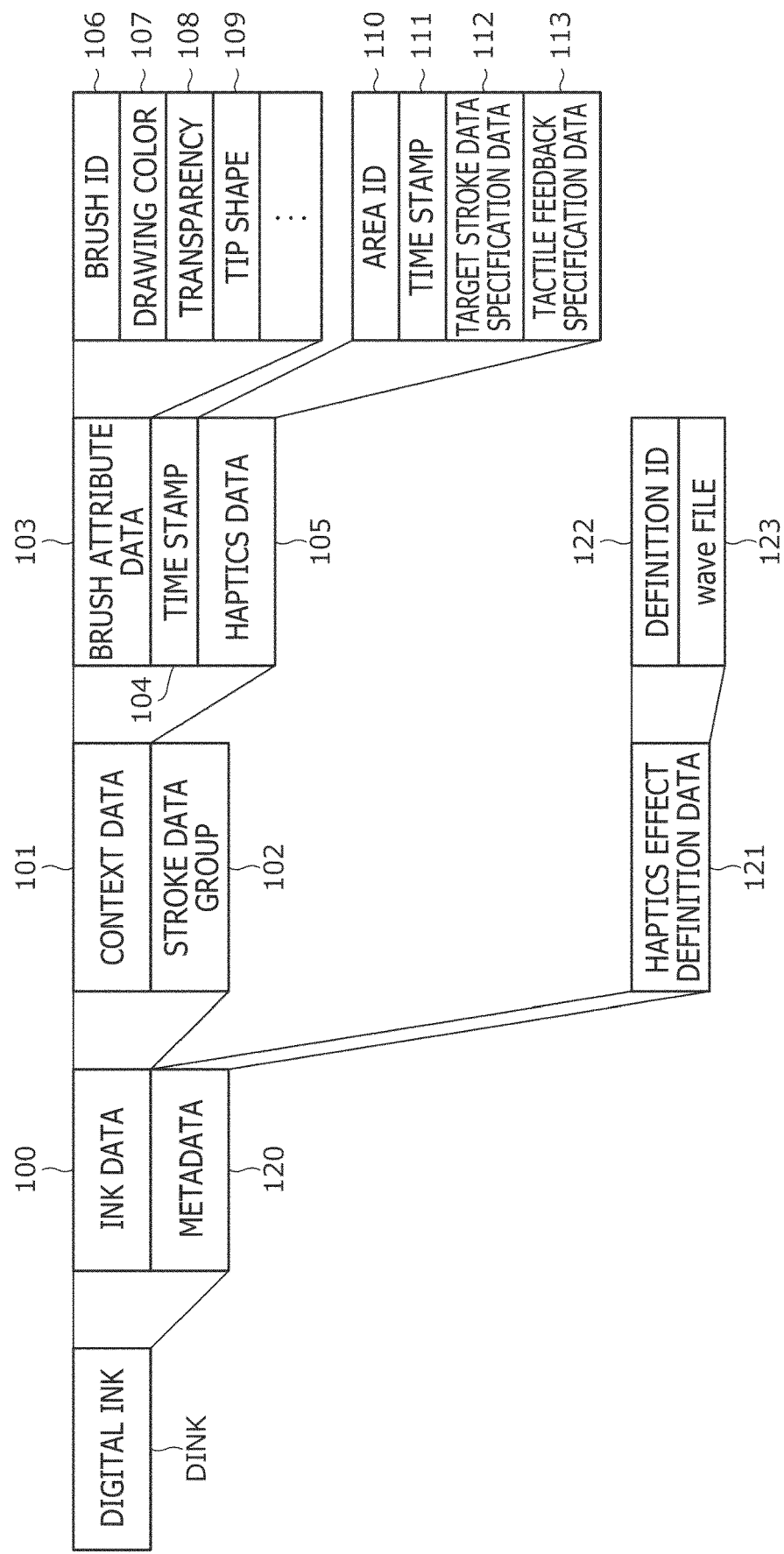
FIG. 3 depicts a data structure of digital ink generated by the tablet terminal illustrated in FIG. 1.

FIG. 3 depicts a data structure of the digital ink DINK generated by the tablet terminal 1a. As illustrated in FIG. 3, the digital ink DINK includes ink data 100 and metadata 120. The ink data 100 includes a stroke data group 102 including a plurality of pieces of stroke data ST (see FIG. 4) indicating results of handwriting input (that is, trajectory of indicator); and context data 101 used for drawing the stroke data ST.

The context data 101 includes brush attribute data 103, a time stamp 104, and haptics data 105. The brush attribute data 103 is data storing data (brush attributes) necessary for drawing the stroke data ST, such as drawing color 107, transparency 108, and tip shape 109 of electronic pen P, in association with a brush ID 106. The time stamp 104 is data in which the start time of the input of the first stroke data ST included in the digital ink DINK is indicated by elapsed time from predetermined time (for example, 00:00:00 on Jan. 1, 1970). The haptics data 105 is data associating tactile feedback with one or more pieces of stroke data ST. The haptics data 105 includes a time stamp 111, target stroke data specification data 112, and tactile feedback specification data 113 in association with an area ID 110. The data included in the haptics data 105 will be described in detail later.

FIG. 4 depicts an example of the stroke data group 102. As illustrated in FIG. 4, each piece of stroke data ST included in the stroke data group 102 has a structure including a plurality of pieces of position data PD between a <trace> tag and a </trace> tag. Each piece of position data PD includes an X coordinate, a Y coordinate, a tilt angle Tilt, a pen pressure value F1, and a grip force value F2 as illustrated in FIG. 4. The stroke data ST also includes attributes including a brush attribute reference value brushRef and a time offset timeOffset. The brush ID 106 is set for the brush attribute reference value brushRef. Each piece of stroke data ST is drawn according to the brush attributes stored in the brush attribute data 103 in association with the brush ID 106. Data indicating input start time of the stroke data ST is set for the time offset timeOffset, in which the input start time is indicated by elapsed time from the time indicated by the time stamp 104 in the context data 101.

The sensor controller 14 typically detects the position and acquires the data at constant time intervals. Thus, the host processor 10 can derive the movement speed of the indicator and the length of the stop time, during which the indicator is stopped, from the amount of change in the coordinates included in the stroke data ST. The movement speed or the length of the stop time derived in this way can be used for drawing the stroke data ST.

FIG. 3 will be further described. The metadata 120 is information added to the ink data 100, and the metadata includes haptics effect definition data 121. The haptics effect definition data 121 is data that defines specific content of the tactile feedback (that is, details of force sense generated by the force sense generation device 15). The haptics effect definition data 121 includes, in association with a definition ID 122, a wave file 123 (waveform data) defining the waveform input to the force sense generation device 15 or path information of the wave file 123. When the tablet terminal 1b reproduces the tactile feedback, the tablet terminal 1b supplies a current corresponding to the wave file 123 to the force sense generation device 15 to realize the reproduction of the tactile feedback.

Figure 6:
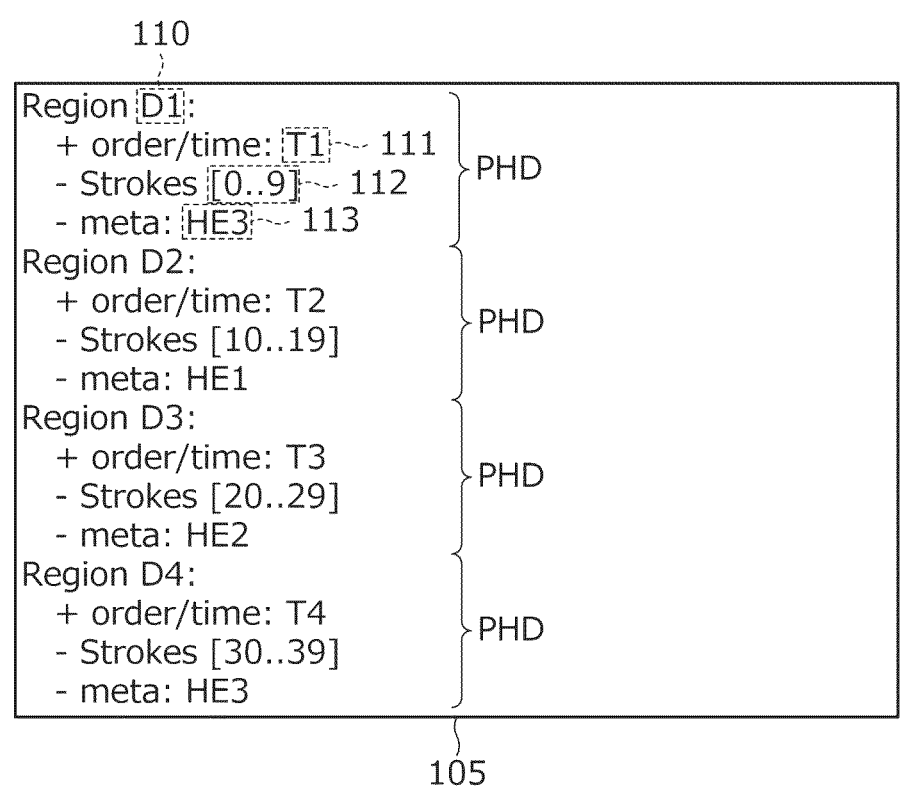
FIG. 6 depicts an example of haptics data illustrated in FIG. 3.

FIG. 5 depicts an example of the haptics effect definition data 121. "HE1," "HE2," and "HE3" illustrated in FIG. 5 are definition IDs 122. The haptics effect definition data 121 of FIG. 5 includes wave files 123 (wave-file 20 and wave-file 30) associated with "HE2" and "HE3." "HE1" includes a description of "No haptics," and the description indicates that the tactile feedback is not provided. In this way, the haptics effect definition data 121 can also include definition indicating that the tactile feedback is not provided. FIG. 6 depicts an example of the haptics data 105. The haptics data 105 illustrated in FIG. 6 corresponds to the digital ink illustrated in FIG. 1 (digital ink illustrating a letter from father to child).

In FIG. 6, the haptics data 105 includes one or more pieces of partial haptics data PHD including different area IDs 110. Each piece of partial haptics data PHD includes the time stamp 111, the target stroke data specification data 112, and the tactile feedback specification data 113 in addition to the area ID 110.

The area ID 110 is a serial number provided to an area (hereinafter, referred to as a "haptics provision area") designated by the user as a target for providing the tactile feedback. FIGS. 1 and 6 illustrate an example in which the user designates four haptics provision areas D1 to D4. The user designates each haptics provision area by using the indicator, such as the electronic pen P, to input stroke data ST (illustrated with a dashed line in FIG. 1) surrounding one or more pieces of stroke data ST, and this will be described in detail later.

The target stroke data specification data 112 is data that specifies one or more pieces of stroke data ST included in the corresponding haptics provision area, and serial numbers of the stroke data ST in the digital ink DINK are described in the target stroke data specification data 112. Hereinafter, each of one or more pieces of stroke data ST specified by the target stroke data specification data 112 will be referred to as "target stroke data ST." For example, in the haptics provision area D1 illustrated in FIG. 1, the target stroke data ST includes a series of stroke data ST indicating a character string "My sweet Emma," a series of stroke data ST of an outline of a heart symbol, and a series of stroke data ST indicating a shaded area as a background of the heart symbol (although the color is gray in FIG. 1, the shaded area may actually be in any chromatic color). In the haptics provision area D2 illustrated in FIG. 1, the target stroke data ST includes a series of stroke data ST of cherries (including leaves and color-painted part).

The tactile feedback specification data 113 is data that defines the content of the tactile feedback to be reproduced at the time of reproduction of the target stroke data ST, and the definition ID 122 illustrated in FIG. 3 is used to describe the tactile feedback specification data 113. For example, "HE3" is described in the tactile feedback specification data 113 of the haptics provision area D1, and "wave-file 30" (see FIG. 5) corresponding to the definition ID 122 "HE3" provides the content of the tactile feedback for the haptics provision area D1.

The time stamp 111 is timing information indicating the reproduction start timing of corresponding tactile feedback, and the earliest input start time among those corresponding one or more pieces of target stroke data ST (that is, earliest time indicated by the time offset timeOffset illustrated in FIG. 4) is described in the time stamp 111. For example, the time offset timeOffset set to the earliest time among the corresponding one or more pieces of target stroke data ST is set in the time stamp 111 as is. The time stamp 111 also plays a role of defining the order of haptics provision areas.

The process executed by the tablet terminal 1a as a handwriting data generation apparatus and the process executed by the tablet terminal 1b as a handwriting data reproduction apparatus will now be described in more detail with reference to flow charts illustrating the processes executed by the tablet terminals 1a and 1b.

Figure 7:
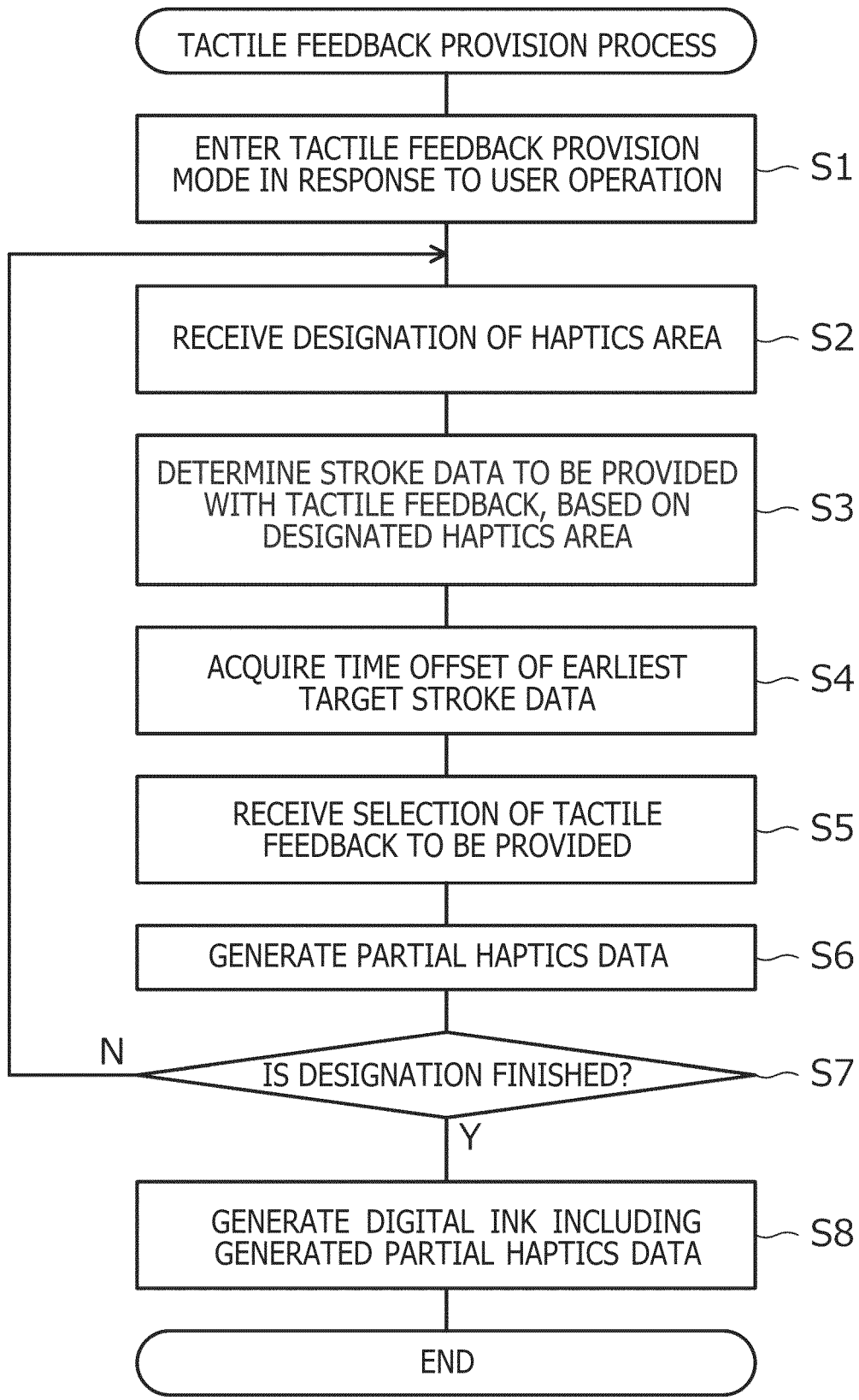
FIG. 7 is a flow chart illustrating a tactile feedback provision process executed by the tablet terminal illustrated in FIG. 1.

FIG. 7 is a flow chart illustrating a tactile feedback provision process executed by the tablet terminal 1a. Note that the process illustrated in FIG. 7 is a process executed by the host processor 10 of the tablet terminal 1a, and the process is executed during the display of the digital ink DINK to be provided with the tactile feedback.

As illustrated in FIG. 7, the tablet terminal 1a first enters a tactile feedback provision mode in response to a user operation (step S1). The tablet terminal 1a in the tactile feedback provision mode waits for the user to designate the haptics provision area. The designation is executed by using the indicator, such as the electronic pen P, to input the stroke data ST surrounding one or more pieces of stroke data ST as described above.

As the stroke data ST input by the indicator forms a closed area, the tablet terminal 1a receives the designation of the haptics provision area (step S2). The tablet terminal 1a then determines one or more pieces of target stroke data ST to be provided with the tactile feedback, based on the designated haptics provision area (step S3). Specifically, the stroke data ST entirely included in the designated haptics provision area may be determined as the target stroke data ST, or the stroke data ST partially included in the designated haptics provision area may be determined as the target stroke data ST.

Next, the tablet terminal 1a acquires the earliest time offset timeOffset (see FIG. 4) associated with the determined one or more pieces of target stroke data ST (step S4) and receives the selection of the tactile feedback to be provided (step S5). The selection of step S5 is performed by selecting one of the plurality of definition IDs 122 stored in the haptics effect definition data 121 illustrated in FIG. 5. However, a plurality of definition IDs 122 may be selected here. This will be described in detail later in a second embodiment.

Next, the tablet terminal 1a generates the partial haptics data PHD illustrated in FIG. 6. Specifically, the tablet terminal 1a first provides the area ID 110 to the haptics provision area received in step S2 and sets the area ID 110 in the partial haptics data PHD. The tablet terminal 1a then sets the time stamp 111, the target stroke data specification data 112, and the tactile feedback specification data 113 in the partial haptics data PHD in association with the area ID 110. The time offset timeOffset acquired in step S4 is set for the time stamp 111. The serial numbers of one or more pieces of target stroke data ST determined in step S3 are set for the target stroke data specification data 112. The definition ID 122 received in step S5 is set for the tactile feedback specification data 113.

After the completion of the generation of the partial haptics data PHD, the tablet terminal 1a determines whether or not the designation of the haptics provision area is finished based on whether or not there is a user operation indicating the end (step S7). If the tablet terminal 1a determines that the designation is not finished, the tablet terminal 1a returns to step S2 to receive the designation of the next haptics provision area. On the other hand, if the tablet terminal 1a determines that the designation is finished, the tablet terminal 1a generates the digital ink DINK including one or more pieces of partial haptics data PHD that has been generated at that point (step S8). The provision of the tactile feedback to the digital ink DINK is completed as a result of the process. As can be understood from the description so far, the tactile feedback provision process can be executed by the user who wrote the digital ink DINK.

Figure 8:
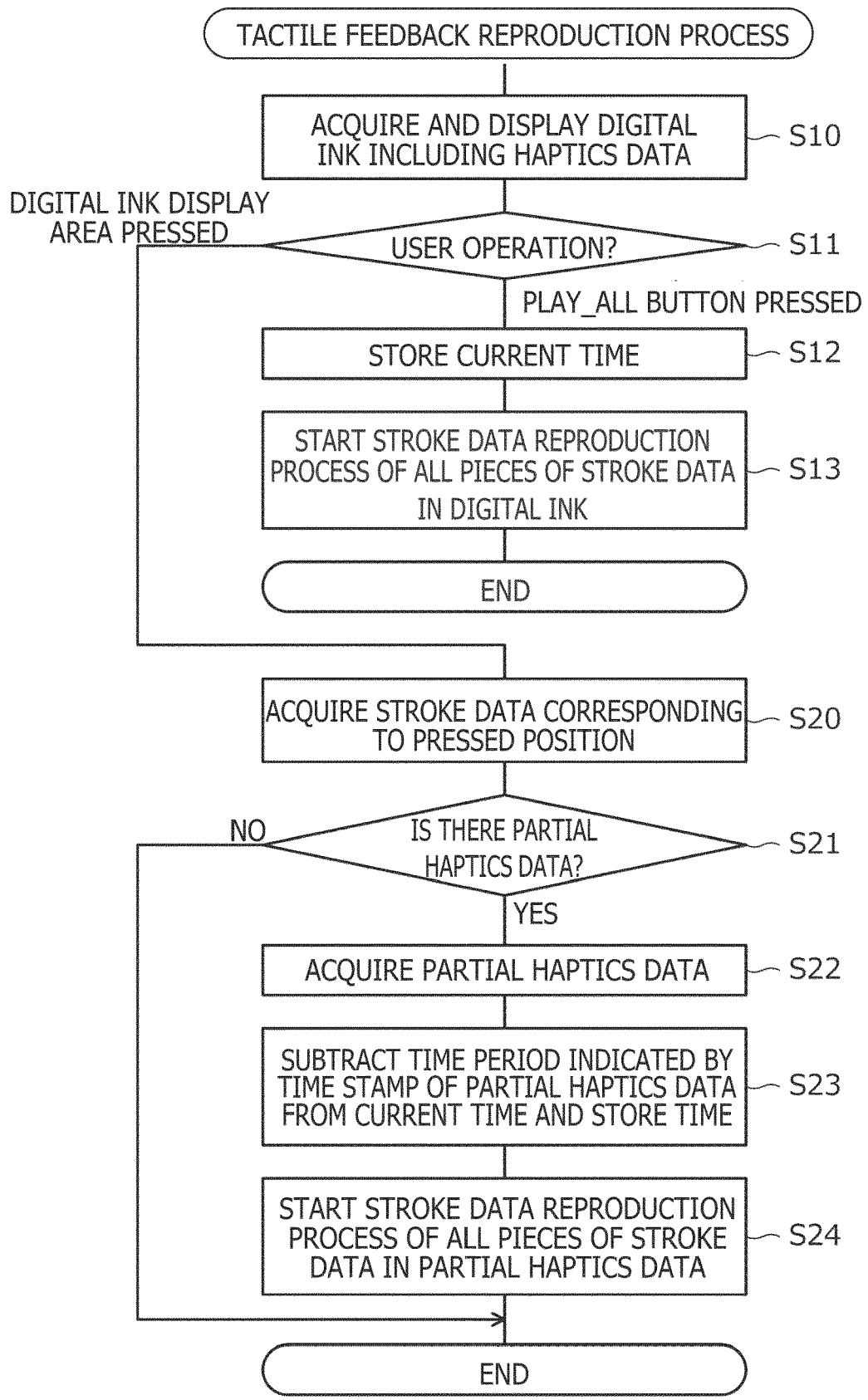
FIG. 8 is a flow chart illustrating a tactile feedback reproduction process executed by the tablet terminal illustrated in FIG. 1.

FIG. 8 is a flow chart illustrating a tactile feedback reproduction process executed by the tablet terminal 1b. Note that the process illustrated in FIG. 8 is a process executed by the host processor 10 of the tablet terminal 1b.

First, the tablet terminal 1b acquires the digital ink DINK including the haptics data 105 from the tablet terminal 1a and displays the digital ink DINK on the display 12 of the tablet terminal 1b (step S10). The tablet terminal 1b then determines whether the user has pressed a PLAY_ALL button or pressed a display area of the digital ink DINK (step S11).

The PLAY_ALL button here is a button for inputting, to the tablet terminal 1b, a user instruction for reproducing all pieces of the stroke data ST in the displayed digital ink DINK. For example, the tablet terminal 1b displays the PLAY_ALL button along with the digital ink DINK on the display 12, and when the PLAY_ALL button is tapped by the indicator, the tablet terminal 1b determines that the PLAY_ ALL button is pressed. This is similar for the pressing of the display area of the digital ink DINK, and when a position in the display area of the digital ink DINK is tapped by the indicator, the tablet terminal 1b determines that the display area of the digital ink DINK is pressed.

If the tablet terminal 1b determines that the PLAY_ALL button is pressed in step S11, the tablet terminal 1b first stores the current time in the storage unit 11 illustrated in FIG. 2 (step S12). The tablet terminal 1b then sets all pieces of the stroke data ST in the digital ink DINK as a target of reproduction and starts a stroke data reproduction process (step S13).

Figure 9:
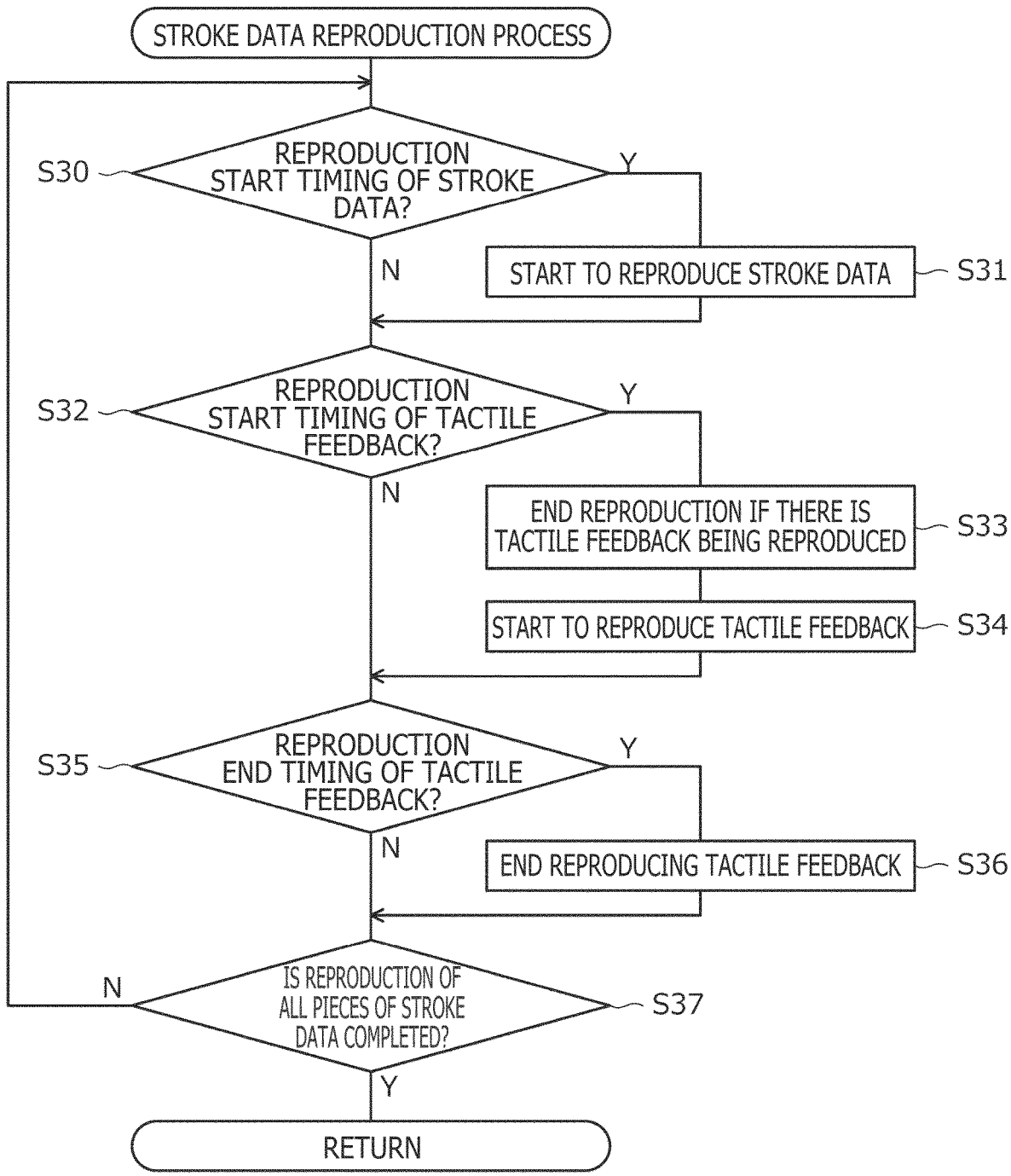
FIG. 9 is a flow chart illustrating details of a stroke data reproduction process illustrated in FIG. 8.

FIG. 9 is a flow chart illustrating details of the stroke data reproduction process. The tablet terminal 1b that has started the stroke data reproduction process determines whether or not the reproduction start timing of one of the pieces of stroke data ST has come (step S30). Specifically, the tablet terminal 1b compares the time offset timeOffset of each piece of stroke data ST to be reproduced and the elapsed time from the time stored in the storage unit 11 in step S12, and when there is stroke data ST in which the latter exceeds the former, the tablet terminal 1b determines that the reproduction start timing of the stroke data ST has come. The tablet terminal 1b that has determined that the reproduction start timing of stroke data ST has come starts to reproduce the stroke data ST (step S31).

Here, the individual pieces of stroke data ST are reproduced by plotting the coordinates included in the stroke data ST at the constant time intervals (time intervals of position detection of the sensor controller 14) and drawing a curve (for example, Catmull-Rom curve) interpolating the coordinates. In this case, to draw the curve, the tablet terminal 1b can use one or more of the tilt angle Tilt, the pen pressure value F1, the grip force value F2, the movement speed of the indicator, the length of the stop time of the indicator (during which the indicator is stopped), and various brush attributes (such as the drawing color 107 of the stroke data ST, the transparency 108 of the stroke data ST, and the tip shape 109 of the electronic pen P). For example, the tablet terminal 1b can draw the curve in the line width corresponding to the pen pressure value F1 and the movement speed of the indicator and in a color of line corresponding to the drawing color 107. The reproduction of the stroke data ST executed in this way ends when plotting of all of the coordinates included in the stroke data ST and drawing of the corresponding curve are completed.

If the tablet terminal 1b determines that the reproduction start timing of none of the stroke data ST has come in step S30 or if step S31 is finished, the tablet terminal 1b determines whether or not the reproduction start timing of any of the tactile feedback has come (step S32). Specifically, the tablet terminal 1b compares the time stamp 111 of each piece of partial haptics data PHD included in the digital ink DINK and the elapsed time from the time stored in the storage unit 11 in step S12, and when there is partial haptics data PHD in which the latter exceeds the former, the tablet terminal 1*b* determines that the reproduction start timing of the tactile feedback included in the partial haptics data PHD has come. The tablet terminal 1*b* that has determined that the reproduction start timing of tactile feedback has come, while there is tactile feedback being reproduced, first stops supplying a current to the force sense generation device 15 to end that reproduction (step S33). The tablet terminal 1*b* then starts supplying a current to the force sense generation device 15 based on the tactile feedback (specifically, wave file) in which the reproduction start timing has come, to start reproduction of the tactile feedback (step S34).

If the tablet terminal 1*b* determines that the reproduction start timing of none of the tactile feedback has come in step S31 or if step S34 is finished, the tablet terminal 1*b* determines whether or not the reproduction end timing of the tactile feedback being reproduced has come (step S35). Specifically, the tablet terminal 1*b* determines that the reproduction end timing of the tactile feedback being reproduced has come if the reproduction of all pieces of the stroke data ST included in the partial haptics data PHD corresponding to the tactile feedback being reproduced is completed. The tablet terminal 1*b* that has determined that the reproduction end timing of the tactile feedback being reproduced has come stops supplying a current to the force sense generation device 15 to end the reproduction of the tactile feedback (step S36).

If the tablet terminal 1*b* determines that the reproduction end timing of the tactile feedback being reproduced has not yet come in step S35 or if step S36 is finished, the tablet terminal 1*b* determines whether or not the reproduction of all pieces of the stroke data ST to be reproduced is completed (step S37). The tablet terminal 1*b* ends the stroke data reproduction process and the tactile feedback reproduction process if the tablet terminal 1*b* determines that the reproduction is completed. The tablet terminal 1*b* returns to step S30 to repeat the process if the tablet terminal 1*b* determines that the reproduction is not completed.

FIG. 8 will be further described. If the tablet terminal 1*b* determines that the display area of the digital ink DINK is pressed in step S11, the tablet terminal 1*b* first acquires the stroke data ST corresponding to the pressed position (step S20). Specifically, the tablet terminal 1*b* may acquire the stroke data ST that passes through the pressed position or may acquire the stroke data ST that is the closest to the pressed position if there is no stroke data ST passing through the pressed position.

Next, the tablet terminal 1*b* determines whether or not there is partial haptics data PHD including the target stroke data specification data 112 indicating the stroke data ST acquired in step S20 (step S21). If the tablet terminal 1*b* determines that there is no partial haptics data PHD, the tablet terminal 1*b* ends the tactile feedback reproduction process. On the other hand, if the tablet terminal 1*b* determines that there is partial haptics data PHD, the tablet terminal 1*b* acquires the partial haptics data PHD (step S22) and subtracts the time period indicated by the time stamp 111 of the acquired partial haptics data PHD from the current time (i.e., going back in time by the time period of the time stamp 111) to store the resulting time in the storage unit 11 (step S23). This is for allowing immediate start of reproduction of the corresponding stroke data ST and the corresponding tactile feedback after the user taps the display area of the digital ink DINK. The tablet terminal 1*b* then sets all pieces of the stroke data ST in the acquired partial haptics data PHD as a target of reproduction and starts the stroke data reproduction process (step S24).

The details of the stroke data reproduction process started here are similar to the details of the stroke data reproduction process described with reference to FIG. 9. However, the determination of steps S30 and S32 is executed based on the time stored in the storage unit 11 in step S23 instead of the time stored in the storage unit 11 in step S12. In addition, the stroke data ST as a determination target of the reproduction start timing in step S30 and the tactile feedback as a determination target of the reproduction start timing in step S32 are only those stroke data ST and those tactile feedback included in the partial haptics data PHD acquired in step S22.

As described above, according to the tablet terminals 1*a* and 1*b* and the digital ink DINK of the present embodiment, the tactile feedback provided to one or more pieces of target stroke data ST can be set in the digital ink DINK, and the person who wrote the text can intentionally set the tactile feedback at the time of reproduction.

Next, the tablet terminals 1*a* and 1*b* according to the second embodiment of the present invention will be described. The structure of the partial haptics data PHD to be generated and the specific details of the stroke data reproduction process of the tablet terminals 1*a* and 1*b* according to the present embodiment are different from those of the tablet terminals 1*a* and 1*b* according to the first embodiment, but the tablet terminals 1*a* and 1*b* according to the present embodiment are similar to the tablet terminals 1*a* and 1*b* according to the first embodiment in other respects. The differences from the tablet terminals 1*a* and 1*b* according to the first embodiment will mainly be described.

Figure 10:
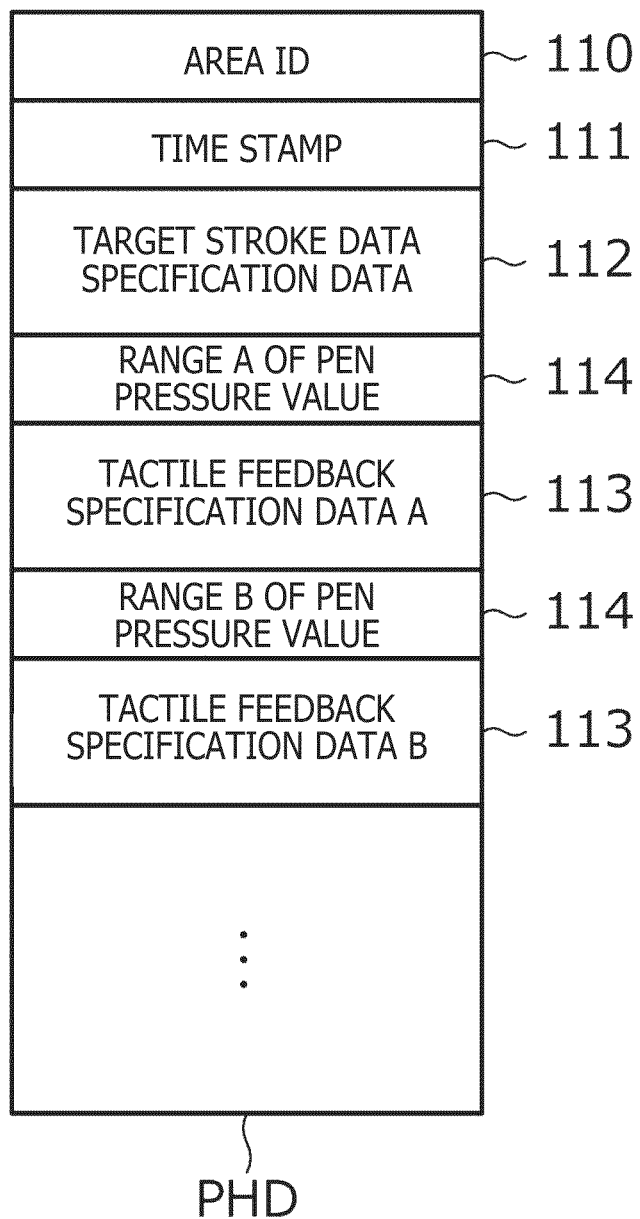
FIG. 10 depicts a structure of partial haptics data according to a second embodiment of the present invention.

FIG. 10 depicts a structure of the partial haptics data PHD according to the present embodiment. As illustrated in FIG. 10, the partial haptics data PHD according to the present embodiment is different from the partial haptics data PHD according to the first embodiment illustrated in FIG. 6 in that the tactile feedback specification data 113 is stored in association with the pen pressure value F1 (specifically, a range 114 of the pen pressure value F1). To generate the partial haptics data PHD, the tablet terminal 1*a* according to the present embodiment allows the user to select the definition ID 122 for each range 114 of the pen pressure value F1 in step S5 of FIG. 7.

Figure 11:
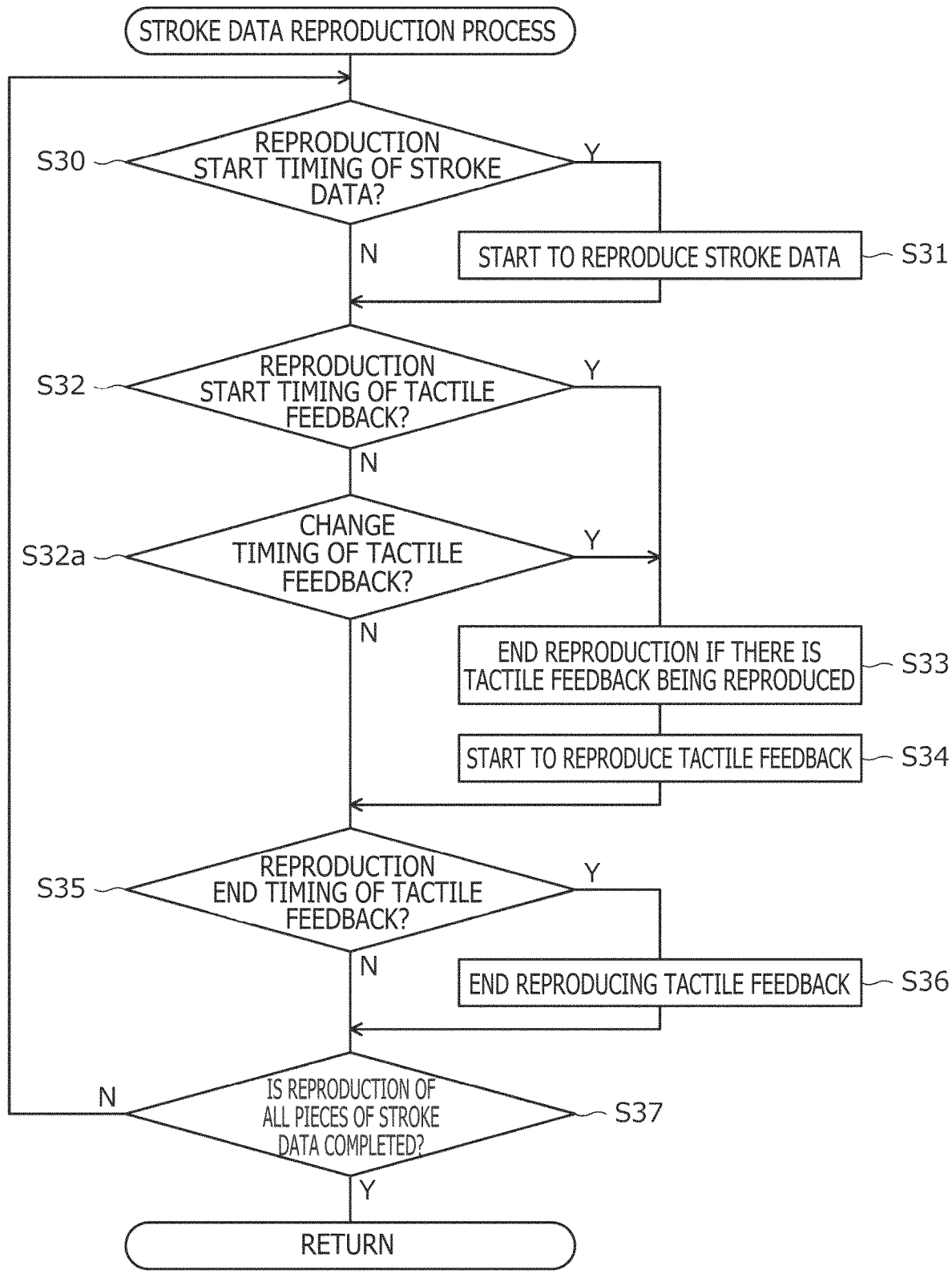
FIG. 11 depicts details of a stroke data reproduction process according to the second embodiment of the present invention.

FIG. 11 depicts details of the stroke data reproduction process according to the present embodiment. As can be understood by comparing FIG. 11 and FIG. 9, a process (step S32*a*) of determining whether or not change timing of the tactile feedback has come is added after a negative determination in step S32 in the present embodiment.

Step S32*a* will specifically be described. After a negative determination result is obtained in step S32, the tablet terminal 1*b* according to the present embodiment determines whether or not timing for changing the tactile feedback to be reproduced has come, based on the pen pressure value F1 included in the currently reproduced position data PD and based on the range 114 of the pen pressure value F1 included in the partial haptics data PHD corresponding to the currently reproduced tactile feedback. If the tablet terminal 1*b* determines that the timing has come, the tablet terminal 1*b* executes steps S33 and S34 as in the case where a positive determination result is obtained in step S32. In step S34, the tactile feedback corresponding to the pen pressure value F1 included in the currently reproduced position data PD is reproduced. If the tablet terminal 1*b* determines that the timing has not yet come, the tablet terminal 1*b* advances the process to step S35.

As described above, according to the tablet terminals 1a and 1b and the digital ink DINK of the present embodiment, the pen pressure value F1 and the tactile feedback specification data 113 are associated with each other in the partial haptics data PHD, and the change timing of the tactile feedback is determined based on the pen pressure value F1. As a result, the tactile feedback can be changed according to the change in the pen pressure value F1. Thus, the user who reproduces the digital ink can view the reproduced digital ink while realistically feeling the pen pressure applied by the user who wrote the digital ink.

Although the example of changing the tactile feedback according to the pen pressure value F1 is described in the present embodiment, it is obvious that the tactile feedback may be changed based on other standards. For example, the tactile feedback may be changed according to the tilt angle Tilt, the grip force value F2, the movement speed of the indicator, the length of the stop time of the indicator (during which the indicator is stopped), or various brush attributes (such as the drawing color 107 of the stroke data ST, the transparency 108 of the stroke data ST, and the tip shape 109 of the electronic pen P) or according to a combination of two or more pieces of data selected from these metrics and the pen pressure value F1. In this case, the specific structure of the partial haptics data PHD and the stroke data reproduction process may be similar to those described in the present embodiment. However, in step S32a of the case where the brush attributes are used as metrics for changing the tactile feedback, whether or not the timing of changing the tactile feedback to be reproduced has come is determined based on the brush attributes of the currently reproduced stroke data ST instead of the pen pressure value F1 included in the currently reproduced position data PD.

Although one force sense generation device 15 is provided in the tablet terminal 1b as a handwriting data reproduction apparatus in the examples described in the first and second embodiments, the tactile feedback may be reproduced by, for example, dividing the display 12 into a plurality of areas, providing the force sense generation device 15 in each of the areas, and driving the force sense generation device 15 of the area including the stroke data ST being reproduced. In this way, the tactile feedback can be locally provided to only part of the display surface, instead of the entire display surface.

In addition, the force sense generation device 15 may be provided in an apparatus different from the tablet terminal 1b. For example, a microphone can be connected to the tablet terminal 1b, and music can be reproduced in association with the reproduction of digital ink indicating lyrics to thereby use the tablet terminal 1b as a karaoke device. In this case, the force sense generation device 15 can be arranged in the microphone to provide the tactile feedback according to the progress of the music to the hand holding the microphone. The force sense generation device 15 can be provided in various other apparatuses, such as a smart bracelet, a smart finger, a smart ring, smart glasses, a smart shirt including built-in heart rate sensor and respiration sensor, a smart watch, a Bluetooth (registered trademark) key tracker, smart shoes, smart socks, smart pants, a smart belt, and a baby controller with Simultaneous Global Positioning System (SGPS)/General Packet Radio Service (GPRS).

In addition, coordinate data that defines the haptics provision area may be provided in the partial haptics data PHD. In this way, the process from step S22 illustrated in FIG. 8 can be executed when the haptics provision area is pressed.

Although one or more pieces of target stroke data ST to be provided with the tactile feedback are determined based on the haptics provision area designated by the user in the first and second embodiments, other methods may be used to determine one or more pieces of target stroke data ST. For example, a semantic segmentation process may be applied to the digital ink DINK. An area obtained based on the result of the process (for example, an area including one or more pieces of stroke data ST corresponding to a logical paragraph) may be set as a haptics provision area, and one or more pieces of target stroke data ST may be determined based on the haptics provision area.

Next, the tablet terminals 1a and 1b according to a third embodiment of the present invention will be described. The tablet terminals 1a and 1b according to the present embodiment are different from the tablet terminals 1a and 1b according to the first embodiment in that the haptics data is provided in the position data PD of each piece of stroke data ST instead of in the context data 101, and that the communication unit 16 is also in compliance with a near field communication standard of Bluetooth (registered trademark) or the like so that the communication unit 16 can communicate with the electronic pen P through the near field communication. The tablet terminals 1a and 1b according to the present embodiment are similar to the tablet terminals 1a and 1b according to the first embodiment in other respects. The differences from the tablet terminals 1a and 1b according to the first embodiment will mainly be described.

FIG. 12 depicts an example of the stroke data group 102 according to the present embodiment. As can be understood by comparing the example of FIG. 12 and the example illustrated in FIG. 4, the stroke data ST according to the present embodiment is different from the stroke data ST according to the first embodiment in that the stroke data ST according to the present embodiment includes haptics data HEP in each piece of position data PD. The haptics data HEP according to the present embodiment is data indicating the content of the tactile feedback, and for example, reproduction strength of the tactile feedback (hereinafter, referred to as "haptics strength") is described in the haptics data HEP. In the following description, it is assumed that the haptics data HEP indicates the haptics strength.

The communication unit 16 (see FIG. 2) of the tablet terminal 1b according to the present embodiment can execute communication through near field communication of Bluetooth (registered trademark) or the like. The electronic pen P can similarly execute communication through near field communication. The electronic pen P according to the present embodiment further includes a force sense generation device similar to the force sense generation device 15. The tablet terminal 1b according to the present embodiment is configured to use the near field communication to control the electronic pen P and cause the force sense generation device in the electronic pen P to generate tactile feedback, and this will be described in detail later.

Figure 13:
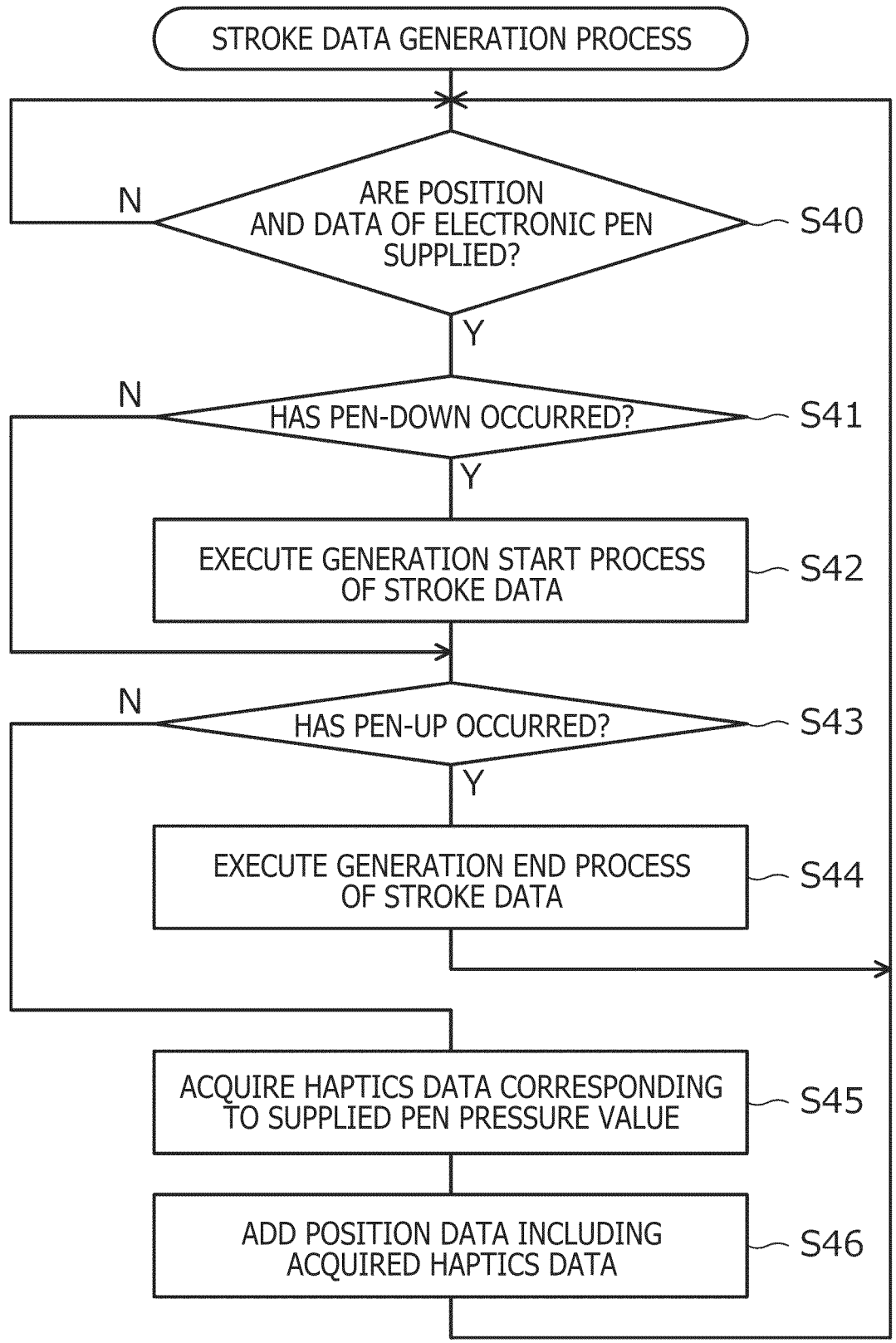
FIG. 13 is a flow chart illustrating a stroke data generation process executed by the tablet terminal according to the third embodiment of the present invention.

FIG. 13 is a flow chart illustrating a stroke data generation process executed by the tablet terminal 1a according to the present embodiment. Note that the process illustrated in FIG. 13 is a process executed by the host processor 10 of the tablet terminal 1a.

As illustrated in FIG. 13, the tablet terminal 1a first determines whether or not the position and the data of the electronic pen P are supplied from the sensor controller 14 (step S40). The tablet terminal 1a repeatedly executes step S40 until the position and the data of the electronic pen P are supplied.

The tablet terminal 1a that has determined that the position and the data of the electronic pen P are supplied in step S40 determines whether or not pen-down has occurred (step S41). In the determination, the tablet terminal 1a determines that pen-down has occurred when the pen pressure value F1 included in the data supplied from the sensor controller 14 is changed from 0 to a value greater than 0. The tablet terminal 1a that has determined that the pen-down has occurred executes a generation start process of the stroke data ST (step S42). Specifically, the tablet terminal 1a generates a header part (<trace> tag) of the stroke data ST illustrated in FIG. 12.

If the tablet terminal 1a determines that the pen-down has not occurred in step S41 or if step S42 is completed, the tablet terminal 1a determines whether or not pen-up has occurred (step S43). In the determination, the tablet terminal 1a determines that pen-up has occurred when the pen pressure value F1 included in the data supplied from the sensor controller 14 is changed from a value greater than 0 to 0. The tablet terminal 1a that has determined that the pen-up has occurred executes a generation end process of the stroke data ST (step S42). Specifically, the tablet terminal 1a generates a footer part (</trace> tag) of the stroke data ST illustrated in FIG. 12 and returns to step S40.

The tablet terminal 1a that has determined that the pen-up has not occurred in step S43 acquires the haptics data HEP corresponding to the pen pressure value F1 included in the supplied data (step S45).

FIG. 14 depicts a corresponding table that associates the pen pressure value F1 with the haptics data HEP indicating the haptics strength. The correspondence table is stored in advance in the tablet terminal 1a, and the tablet terminal 1a acquires the haptics data HEP according to the correspondence table in the process of step S45.

FIG. 13 will be further described. The tablet terminal 1a that has acquired the haptics data HEP adds the position data PD including the acquired haptics data HEP to the stroke data ST being generated and returns the process to step S40. As a result of the process, the stroke data ST including the haptics data HEP in the position data PD is generated between the pen-down and the pen-up.

Figure 15:
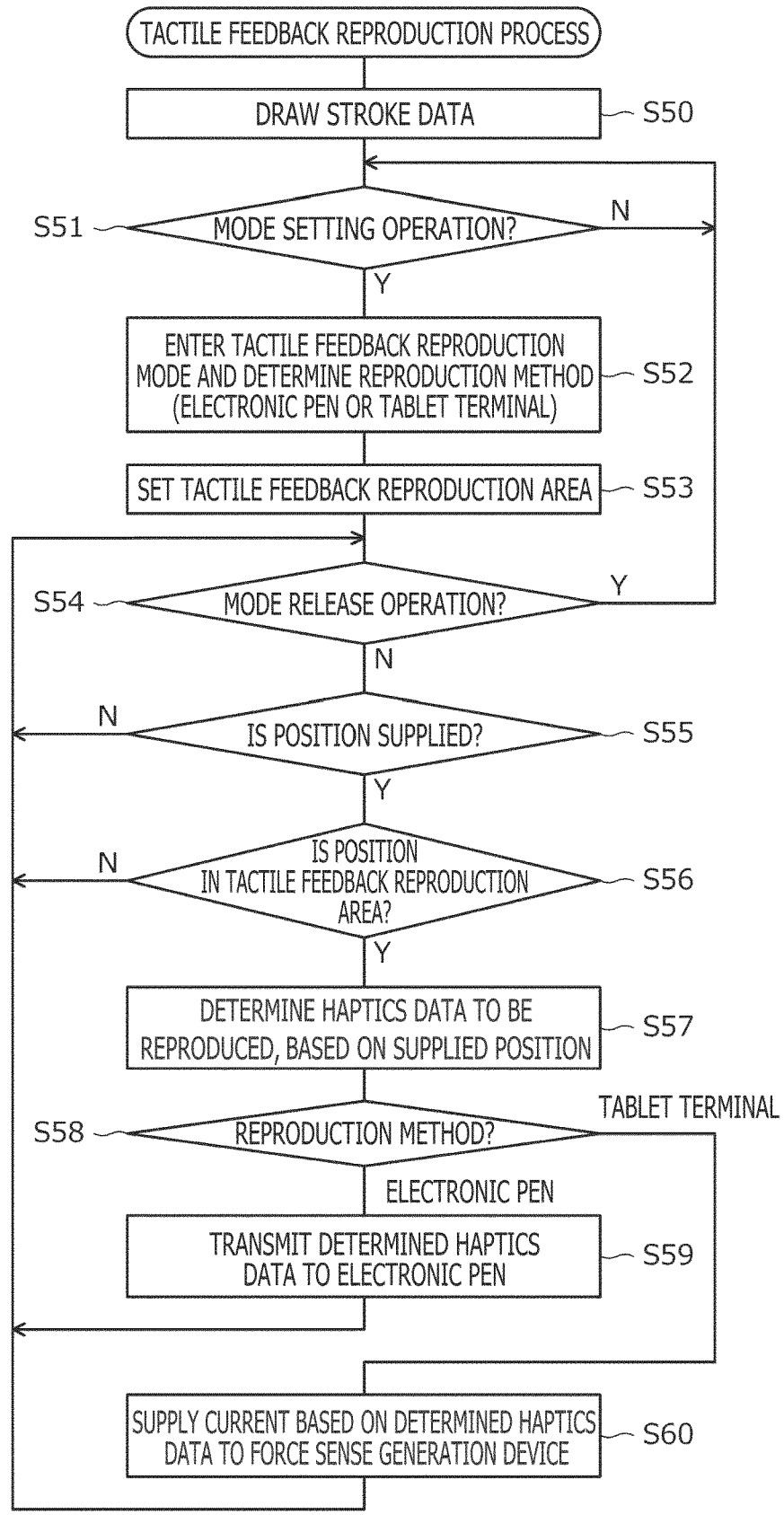
FIG. 15 is a flow chart illustrating a tactile feedback reproduction process executed by the tablet terminal according to the third embodiment of the present invention.

FIG. 15 is a flow chart illustrating a tactile feedback reproduction process executed by the tablet terminal 1b according to the present embodiment. Note that the process illustrated in FIG. 15 is a process executed by the host processor 10 of the tablet terminal 1b. In response to reception of designation of the position data PD designated by the user, the host processor 10 in the example uses the force sense generation device in the electronic pen P or in the tablet terminal 1b to reproduce the tactile feedback indicated by the haptics data HEP included in the designated position data PD.

Specifically, the tablet terminal 1b first draws one or more pieces of stroke data ST (step S50). As a result, one or more pieces of stroke data ST are displayed on the display 12 of the tablet terminal 1b.

Next, the tablet terminal 1b determines whether or not the user has performed a mode setting operation for entering a tactile feedback reproduction mode (step S51). The operation is, for example, clicking or tapping of a button displayed by the tablet terminal 1b on the display 12. The tablet terminal 1b repeats the process of step S51 until the tablet terminal 1b determines that the mode setting operation is performed. If the tablet terminal 1b determines that the mode setting operation is performed, the tablet terminal 1b enters the tactile feedback reproduction mode and determines a reproduction method of the tactile feedback (step S52).

The reproduction method of the tactile feedback is, for example, one of a method of causing the force sense generation device in the electronic pen P to reproduce the tactile feedback and a method of causing the force sense generation device 15 in the tablet terminal 1b to reproduce the tactile feedback. For example, when the mode setting operation is performed by the electronic pen P, the tablet terminal 1b can determine whether or not the electronic pen P includes the force sense generation device, based on the content of the downlink signal transmitted by the electronic pen P. If the tablet terminal 1b determines that the electronic pen P includes the force sense generation device, the tablet terminal 1b is required to determine to cause the force sense generation device in the electronic pen P to reproduce the tactile feedback. If the tablet terminal 1b determines that the electronic pen P does not include the force sense generation device, the tablet terminal 1b is required to determine to cause the force sense generation device 15 in the tablet terminal 1b to reproduce the tactile feedback. In addition, when, for example, the mode setting operation is performed by a finger, the tablet terminal 1b is required to determine to cause the force sense generation device 15 in the tablet terminal 1b to reproduce the tactile feedback.

The tablet terminal 1b then sets a tactile feedback reproduction area in a drawing area of the stroke data ST drawn in step S50 and around the drawing area (step S53).

Figure 16A:
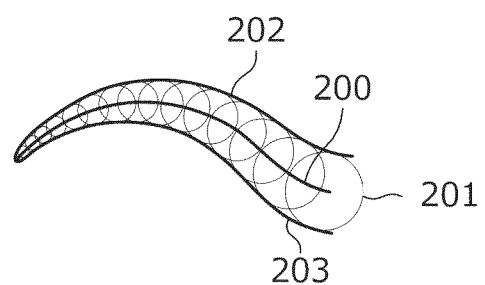
FIGS. 16A and 16B are diagrams describing a tactile feedback reproduction area set in step S53 of FIG. 15.
Figure 16B:
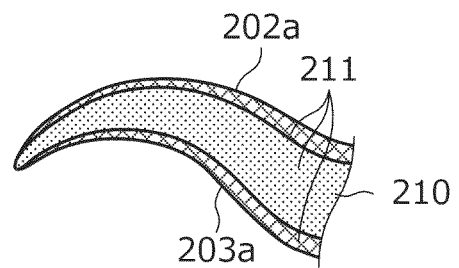

FIGS. 16A and 16B are diagrams describing the tactile feedback reproduction area set in step S53. A curve 200 illustrated in FIG. 16A represents an approximation curve (specifically, a Bezier curve, a Catmull-Rom curve, or the like) obtained from a plurality of coordinates included in the stroke data ST. Each circle 201 illustrated in FIG. 16A represents the position of each coordinate included in the stroke data ST and the magnitude of the pen pressure value F1 at the position.

To draw the stroke data ST in step S50, the tablet terminal 1b obtains envelopes 202 and 203 of the circles 201 at the coordinates. The tablet terminal 1b then acquires a drawing area 210 of the stroke data ST, which is an area between the envelopes 202 and 203, as illustrated in FIG. 16B. The tablet terminal 1b paints the inside of the drawing area 210 in a given color to draw the stroke data ST, and as a result, the user can visually recognize the stroke data ST.

The tablet terminal 1b that has drawn the stroke data ST in this way sets a tactile feedback reproduction area 211 invisible for the user in the drawing area 210 and around (both sides of) the drawing area 210 in step S53. Specifically, the tablet terminal 1b can, for example, virtually set circles obtained by enlarging the radii of the circles 201 at a predetermined ratio (for example, 5%) and obtain envelopes 202a and 203a of the circles. The tablet terminal 1b can then set the area between (bound by) the envelopes 202a and 203a as the tactile feedback reproduction area 211. In this way, the tablet terminal 1b can reproduce the tactile feedback in an area a little wider than the drawing area 210. In a case where such an effect is not necessary, the tablet terminal 1b sets the drawing area 210 as the tactile feedback reproduction area 211.

FIG. 15 will be further described. The tablet terminal 1b that has set the tactile feedback reproduction area determines whether or not the user has performed a mode release operation for releasing the tactile feedback reproduction mode (step S54). The operation may be, for example, clicking or a tapping of a button displayed by the tablet terminal 1b on the display 12. The tablet terminal 1b that has determined that the mode release operation is performed in step S54 returns the process to step S51. On the other hand, if the tablet terminal 1b determines that the mode release operation is not performed, the tablet terminal 1b determines whether or not the position of the indicator is supplied from the sensor controller 14 (step S55).

The tablet terminal 1b that has determined in step S55 that the position is not supplied returns to step S54 to continue the process. On the other hand, the tablet terminal 1b that has determined that the position is supplied determines whether or not the supplied position is a position in the tactile feedback reproduction area set in step S53 (step S56). The tablet terminal 1b that has determined that the supplied position is not a position in the tactile feedback reproduction area returns to step S54 to continue the process. On the other hand, the tablet terminal 1b that has determined that the supplied position is a position in the tactile feedback reproduction area determines the haptics data HEP to be reproduced, based on the supplied position (step S57). Specifically, the tablet terminal 1b determines the position data PD which includes coordinates closest to the supplied position among one or more pieces of position data PD included in the displayed stroke data ST, and determines that the haptics data HEP included in the position data PD is to be reproduced.

The tablet terminal 1b then determines whether the reproduction method determined in step S52 is the method of causing the force sense generation device in the electronic pen P to reproduce the tactile feedback or the method of causing the force sense generation device 15 in the tablet terminal 1b to reproduce the tactile feedback (step S58). If the tablet terminal 1b determines that the reproduction method is the former, the tablet terminal 1b transmits the haptics data HEP determined in step S57 to the electronic pen P through near field communication (step S59). If the tablet terminal 1b determines that the reproduction method is the latter, the tablet terminal 1b supplies a current based on the haptics data HEP determined in step S57 to the force sense generation device 15 (step S60). As a result, the tactile feedback corresponding to the position touched by the user using the electronic pen P or a finger is reproduced by the electronic pen P or the tablet terminal 1b.

The waveform of the current supplied to the force sense generation device as a result of step S59 or step S60 executed by the tablet terminal 1b can be set in advance in the electronic pen P or the tablet terminal 1b. However, designation of waveform data by the user may be received in the stroke data generation process illustrated in FIG. 13, and information indicating the waveform data may be included in the haptics data HEP. In this case, the corresponding wave file may be transmitted to the electronic pen P in step S59.

As described above, according to the tablet terminals 1a and 1b, the electronic pen P, and the digital ink DINK of the present embodiment, the haptics data HEP is provided in the position data PD of each piece of stroke data ST, and in response to the reception of the designation of the position data PD made by the user, the tactile feedback indicated by the haptics data HEP included in the designated position data PD is reproduced. Thus, when the user uses the electronic pen P or a finger to trace the displayed stroke data ST, the tactile feedback can be reproduced according to the pen pressure value of the user at the time that the user writes the part of the stroke data ST corresponding to the position touched by the electronic pen P or the finger.

In addition, according to the tablet terminals 1a and 1b, the electronic pen P, and the digital ink DINK of the present embodiment, the haptics data HEP is provided in the position data PD of the stroke data ST. Thus, the tactile feedback can be reproduced even in an electronic pen or a tablet terminal not supporting the haptics data 105 or the haptics effect definition data 121 illustrated in FIG. 3.

Although the tactile feedback is reproduced when the user uses the electronic pen P or a finger to trace the displayed stroke data ST in the example described in the present embodiment, the tactile feedback may be reproduced at the time of reproduction of the stroke data ST. Specifically, when the part of the stroke data ST corresponding to each piece of position data PD in the stroke data ST is to be reproduced, the tactile feedback indicated by the haptics data HEP included in the position data PD can be reproduced. In this way, the user who reproduces the digital ink can view the reproduced digital ink while realistically feeling the pen pressure of the user who wrote the digital ink as in the second embodiment.

Although the haptics data HEP is obtained from the pen pressure value F1 in step S45 of FIG. 13 in the present embodiment, the tablet terminal 1a may obtain the haptics data HEP from other vales, such as the grip force value F2, the movement speed of the indicator, the tilt angle, and the output value of the gyro sensor. In addition, an apparatus that measures the heart rate or the blood oxygen level may be attached to the user, and the measurement result may be supplied to the tablet terminal 1a to obtain the haptics data HEP from the heart rate or the blood oxygen level. In this case, the fields on the left side of FIG. 14 include combinations of values to be referenced to obtain the haptics data HEP.

According to the process illustrated in FIG. 15, the haptics data HEP is transmitted to the electronic pen P every time the position is supplied from the sensor controller 14 to the host processor 10. However, the tablet terminal 1b may transmit the haptics data HEP to the electronic pen P only when there is a change in the content of the haptics data HEP, and the electronic pen P may continue to reproduce the tactile feedback based on the haptics data HEP that has been received, until new haptics data HEP is transmitted. In this way, the amount of communication between the tablet terminal 1b and the electronic pen P can be reduced.

The value, such as the pen pressure value F1, is converted into the haptics data HEP in the tablet terminal 1b, and the haptics data HEP is transmitted from the tablet terminal 1b to the electronic pen P, in the example described in the present embodiment. Alternatively, the value, such as the pen pressure value F1, may be converted into the haptics data HEP in the electronic pen P, and the value, such as the pen pressure value F1, may be transmitted from the tablet terminal 1b to the electronic pen P. In this case, it is preferable to provide in advance the correspondence table illustrated in FIG. 14 in the electronic pen P.

Although the stroke data ST generated according to the input through the electronic pen P is considered and described in the present embodiment, the present invention can also be applied to the stroke data ST generated according to the input through other types of indicators. For example, the haptics data HEP can be determined based on the movement speed of an air mouse operated in the air, and the determined haptics data HEP can be provided in the position data PD. In this way, the user who reproduces the tactile feedback can realistically feel the movement speed of the air mouse. Similarly, the haptics data HEP can be determined based on the grip force value of a spray-type electronic pen, and the determined haptics data HEP can be provided in the position data PD. In this way, the user who reproduces the tactile feedback can realistically feel the discharge strength of the spray.

According to a further aspect the invention provides a digital ink data structure, which is for use with a computer including a display, a memory, and a processor, and which is to be stored in the memory. The digital ink data structure includes stroke data, and haptics data that associates a target stroke data out of the stroke data with tactile feedback. The data structure is used to reproduce the stroke data for displaying the stroke data on the display, and is used by the processor, in controlling a force sense generation device to reproduce the tactile feedback indicated by the haptics data at the time of reproduction of the stroke data, to acquire (read) content of the tactile feedback from the memory. The stroke data may include a pen pressure value, wherein the haptics data may associate the pen pressure value with waveform data for reproducing the tactile feedback.

Although the preferred embodiments of the present invention have been described, the present invention is not limited to the embodiments in any way, and it is obvious that the present invention can be carried out in various modes without departing from the scope of the present invention.

What is claimed is:

1. A handwriting data generation apparatus comprising:
   a memory containing processor-executable instructions; and
   a processor coupled to the memory and configured to perform, when loaded with the processor-executable instructions:
   determining target stroke data, which is at least part of stroke data generated according to handwriting input made by a pen, wherein the stroke data includes position data and a pen pressure value of the pen;
   generating haptics data indicating tactile feedback to be associated with the target stroke data, wherein the haptics data is different from the pen pressure value;
   associating the tactile feedback with the target stroke data; and
   generating digital ink including the stroke data and the haptics data;
   wherein the target stroke data included in the digital ink is reproduced to display the target stroke data on a screen, and the haptics data included in the digital ink is reproduced, when the digital ink is reproduced, to exhibit the tactile feedback in association with the displayed target stroke data.

2. The handwriting data generation apparatus according to claim 1, wherein
   the processor determines the target stroke data, based on a haptics area to be associated with the tactile feedback.

3. The handwriting data generation apparatus according to claim 2, wherein
   the processor receives designation of the haptics area when the stroke data input by the pen forms a closed area.

4. The handwriting data generation apparatus according to claim 2, wherein
   the processor applies a semantic segmentation process to the stroke data to determine the haptics area.

5. The handwriting data generation apparatus according to claim 1, wherein
   the haptics data is data associating the pen pressure value with waveform data for generating the tactile feedback.

6. The handwriting data generation apparatus according to claim 1, wherein
   the stroke data includes a tilt angle; and
   the haptics data is data associating the tilt angle with waveform data for generating the tactile feedback.

7. The handwriting data generation apparatus according to claim 1, wherein
   the stroke data includes a grip force value; and
   the haptics data is data associating the grip force value with waveform data for generating the tactile feedback.

8. The handwriting data generation apparatus according to claim 1, wherein
   the position data includes a plurality of coordinates detected at constant time intervals; and
   the haptics data is data associating a movement speed of the pen that is indicated by an amount of change in the coordinates with waveform data for generating the tactile feedback.

9. The handwriting data generation apparatus according to claim 1, wherein
   the position data includes a plurality of coordinates detected at constant time intervals; and
   the haptics data is data associating a length of stop time, during which the pen is stopped as indicated by an amount of change in the coordinates, with waveform data for generating the tactile feedback.

10. The handwriting data generation apparatus according to claim 1, wherein
    the stroke data includes a brush attribute; and
    the haptics data is data associating the brush attribute with waveform data for generating the tactile feedback.

11. The handwriting data generation apparatus according to claim 1, wherein
    the processor associates the haptics data with the position data to associate the tactile feedback with the target stroke data.

12. The handwriting data generation apparatus according to claim 11, wherein
    the processor determines the haptics data every time a position is supplied from a sensor controller that detects a position of the pen, and the processor generates the position data including the supplied position and the determined haptics data.

13. The handwriting data generation apparatus according to claim 12, wherein
    the processor determines the haptics data, based on the pen pressure value supplied from the sensor controller.

14. A handwriting data generation method comprising:
    determining target stroke data, which is at least part of stroke data generated according to handwriting input made by a pen, wherein the stroke data includes position data and a pen pressure value of the pen;
    generating haptics data indicating tactile feedback to be associated with the target stroke data, wherein the haptics data is different from the pen pressure value;
    associating the tactile feedback with the target stroke data; and
    generating digital ink including the stroke data and the haptics data;
    wherein the target stroke data included in the digital ink is reproduced to display the target stroke data on a screen, and the haptics data included in the digital ink is reproduced, when the digital ink is reproduced, to exhibit the tactile feedback in association with the displayed target stroke data.

15. The handwriting data generation method according to claim 14, wherein the target stroke data is determined based on a haptics area to be associated with the tactile feedback.

16. The handwriting data generation method according to claim 15, comprising:
    receiving designation of the haptics area when the stroke data input by the pen forms a closed area.

17. The handwriting data generation method according to claim 15, comprising:

applying a semantic segmentation process to the stroke data to determine the haptics area.

18. The handwriting data generation method according to claim 14, wherein the haptics data is data associating the pen pressure value with waveform data for generating the tactile feedback.

19. The handwriting data generation method according to claim 14, wherein the stroke data includes a tilt angle; and the haptics data is data associating the tilt angle with waveform data for generating the tactile feedback.

20. The handwriting data generation method according to claim 14, wherein the stroke data includes a grip force value; and the haptics data is data associating the grip force value with waveform data for generating the tactile feedback.

21. The handwriting data generation method according to claim 14, wherein the position data includes a plurality of coordinates detected at constant time intervals; and the haptics data is data associating a movement speed of the pen that is indicated by an amount of change in the coordinates with waveform data for generating the tactile feedback.

22. The handwriting data generation method according to claim 14, wherein the position data includes a plurality of coordinates detected at constant time intervals; and the haptics data is data associating a length of stop time, during which the pen is stopped as indicated by an amount of change in the coordinates, with waveform data for generating the tactile feedback.

23. The handwriting data generation method according to claim 14, wherein the stroke data includes a brush attribute; and the haptics data is data associating the brush attribute with waveform data for generating the tactile feedback.

24. The handwriting data generation method according to claim 14, comprising:

associating the haptics data with the position data to associate the tactile feedback with the target stroke data.

25. The handwriting data generation method according to claim 24, comprising:

determining the haptics data every time a position is supplied from a sensor controller that detects a position of the pen, and generating the position data including the supplied position and the determined haptics data.

26. The handwriting data generation method according to claim 25, comprising:

determining the haptics data based on the pen pressure value supplied from the sensor controller.

* * * * *